March 12, 1940.    K. KECK    2,193,068
FRICTION CLUTCH AND BRAKE
Filed Feb. 16, 1938    3 Sheets-Sheet 1

March 12, 1940.  K. KECK  2,193,068

FRICTION CLUTCH AND BRAKE

Filed Feb. 16, 1938  3 Sheets-Sheet 2

Inventor:
Karl Keck
by S. Sokal.
Attorney.

March 12, 1940. K. KECK 2,193,068
FRICTION CLUTCH AND BRAKE
Filed Feb. 16, 1938 3 Sheets-Sheet 3
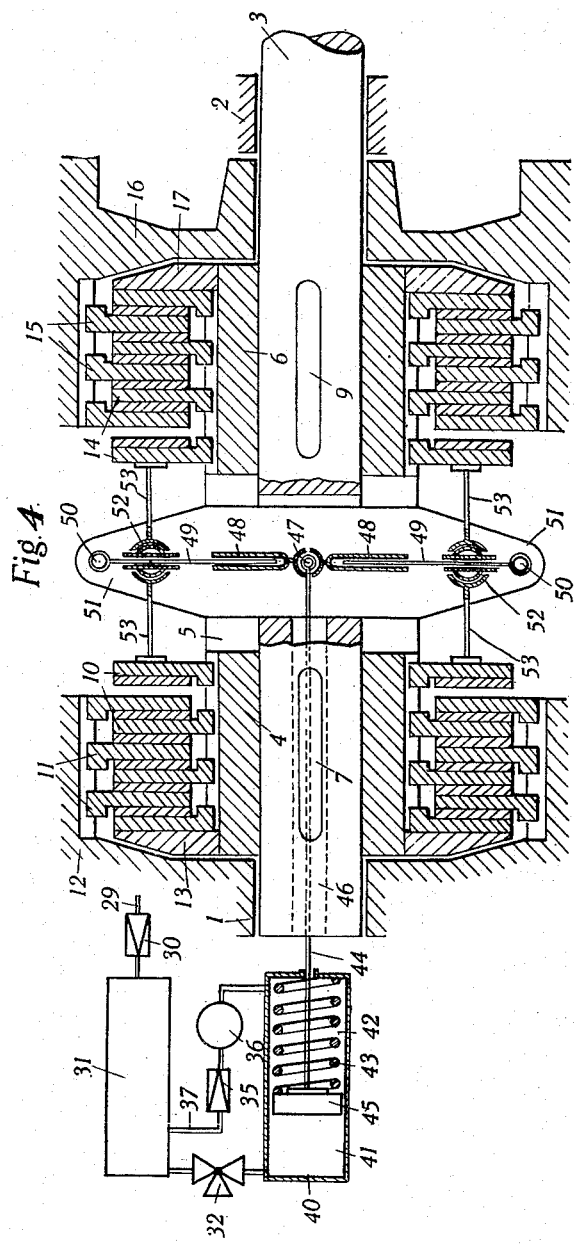

Patented Mar. 12, 1940

2,193,068

UNITED STATES PATENT OFFICE 2,193,068

FRICTION CLUTCH AND BRAKE

Karl Keck, Goppingen, Germany, assignor to L. Schuler, A.-G., Goppingen (Wurttemberg), Germany Application February 16, 1938, Serial No. 190,836
In Germany February 24, 1937

6 Claims. (Cl. 192—18)

The invention relates to a combined friction clutch and brake of the kind wherein the brake and the clutch constitute a unit mounted upon the common shaft. It is known in connection with combined friction plate clutches and brakes of this type to simplify the operation of the brake and the clutch by rigidly connecting together those plates mounted on and rotating with the driven shaft which are directly acted upon by the clutch and brake operating forces. In connection with clutches of known construction it is known to use pressure air for engaging the clutch, disengagement of the clutch being effected by spring forces. Owing to the mentioned rigid connection of the adjacent clutch and brake plates, engagement of the clutch and disengagement of the brake, and vice versa, disengagement of the clutch and engagement of the brake, take place simultaneously. In the known construction it is somewhat difficult to employ sufficiently strong springs, as owing to the comparative smallness of the available space due to the required compactness of the structure, there is not sufficient room for the reception of strong springs. Moreover, it is usual to employ several springs distributed along the periphery of the plates, and these have to be exactly adjusted in order to obtain a uniform operating pressure. This adjustment of the springs is complicated and rather difficult to attain with sufficient accuracy.

It is the object of the invention to avoid the existing drawbacks of the known combined friction clutches and brakes and to simplify at the same time their construction. This object is attained according to the invention by using, for the disengagement of the clutch and the simultaneous engagement of the brake, springs of a size just sufficient to effect in a reliable manner the disengagement of the clutch, whilst producing the additional force required for engaging the brake by permanently operative pressure air, the pressure of said air being less than the pressure of the pressure air used for engaging the clutch. According to one construction of the improved combined friction clutch and brake which is, as regards the structure of its individual parts, somewhat similar to a known combined friction clutch and brake in which the pressure air operated piston surface is arranged between the clutch and the brake, the said surface is constituted either by a number of individual circular pistons or by a single annular piston. In another construction, the pressure air cylinder is arranged outside the clutch and the brake. In this construction the two working surfaces of the piston, acted upon by pressure air, are represented by a single piston coaxial with the shaft carrying the brake and the clutch. In this construction, the piston rod extends partly into the shaft and acts with its free end upon two or more levers mounted in hubs or like members carried by the shaft, the movements of these levers being transmitted to rods by which the adjacent clutch and brake plates are rigidly connected.

The accompanying drawings show some constructional examples of a combined friction plate clutch and brake according to the invention.

Fig. 4 is a part sectional elevation of a third construction.

Figure 1:
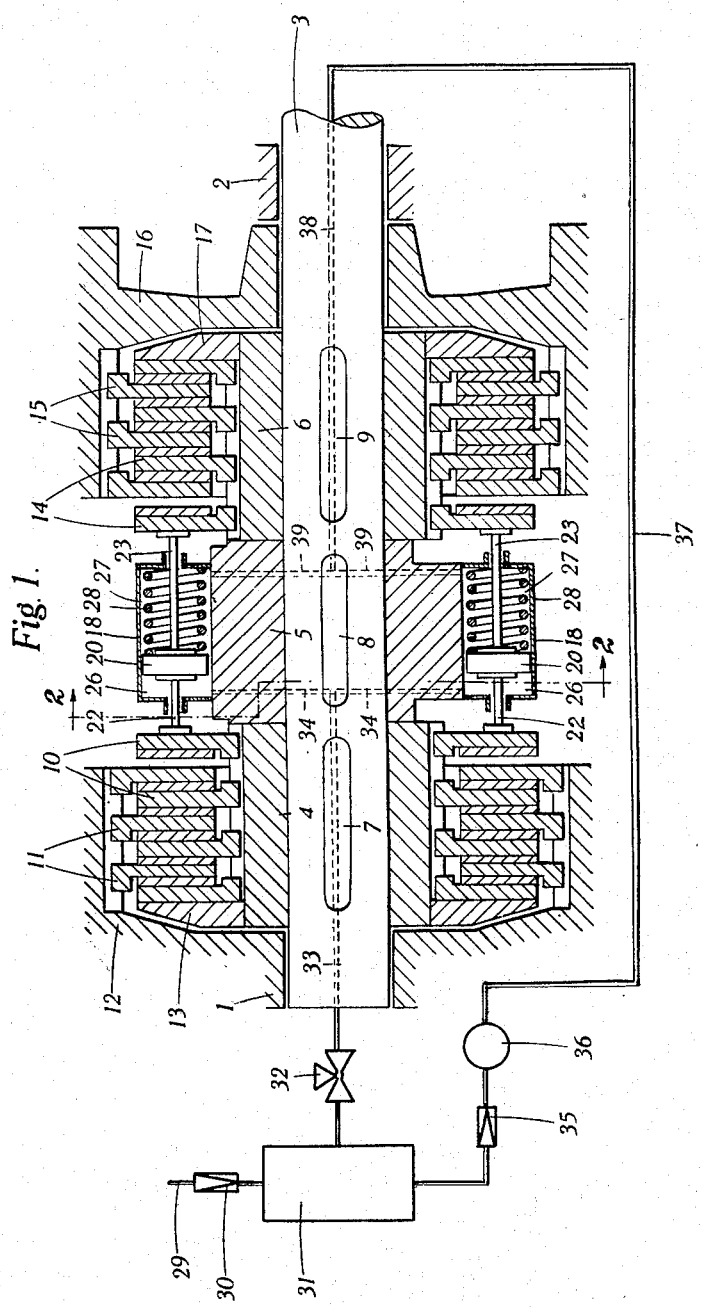
Fig. 1 is a part sectional elevation of the first construction taken on the line I—I of Figure 3.
Figure 2:
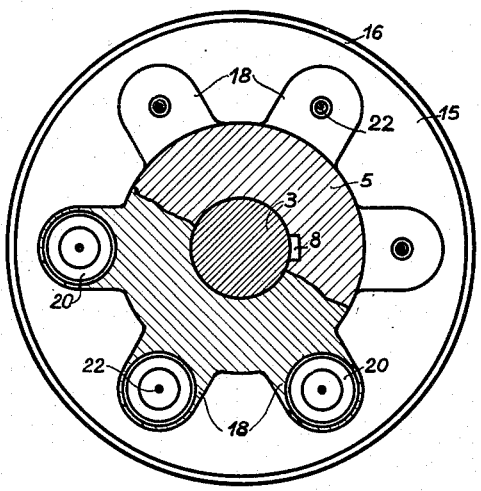
Fig. 2 is a section on the line 2—2 of Fig. 1.
Figure 3:
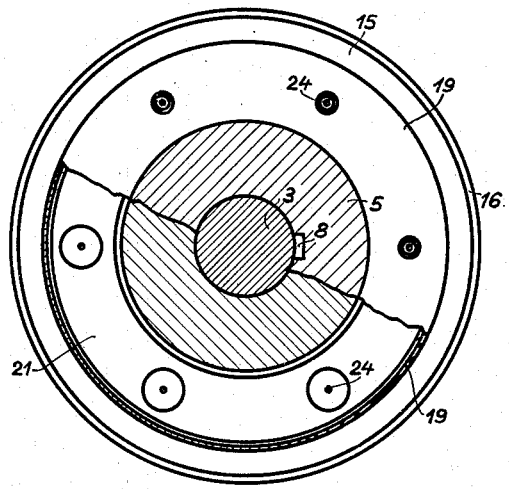
Fig. 3 is a similar view to Fig. 2, but showing a modified construction.

Referring first to Figs. 1 and 2, 3 indicates the driven shaft mounted in bearings 1 and 2. Upon this shaft are fixedly mounted three sleeves 4, 5, 6 by means of corresponding feather keys 7, 8, 9. The sleeve 4, hereinafter referred to as the "brake sleeve" carries a set of brake plates 10, this set of plates co-operating in known manner with another set of plates 11 mounted in the stationary casing 12. For the sake of simplicity, the bearing 1 is shown here directly connected with the casing 12. A disc 13 screwed on or otherwise fixed to the brake sleeve 4 serves as a stop limiting the inward movement of the plates during the engagement. In a similar manner, the sleeve 6, hereinafter referred to as the "clutch sleeve" carries one set of clutch plates 14, the other corresponding set of plates 15 being mounted in and rotating with the driving part 16 which may be constituted, for instance, by a belt pulley, a flywheel, gear wheel, or other member. For limiting the inward movement of the plates of the clutch during the engagement of the clutch, a stop 17 is provided constituted by a disc rigidly connected with the clutch sleeve 6. The sleeve 5 serves for the reception of the pressure air cylinder or cylinders 18 which are made circular in cross-section and are uniformly distributed over the periphery of the clutch and brake. Circular pistons 20 are slidably mounted in the cylinders 18, each piston 20 having piston rods 22 and 23 which extend outwardly and are rigidly connected with a brake plate 10 and a clutch plate 14 respectively.

The modified construction shown in Fig. 3 differs from that above described only in that, instead of there being a plurality of separate cylinders 18 and pistons 20, only one annular cylinder 19 is provided, which encloses the sleeve 5 in the form of a ring. Within the cylinder 19 is a piston 21 which has several piston rods which act upon the brake plate 10 and the clutch plate 14 respectively, in a similar manner as the piston rods 22 and 23 in the first described construction. Only the piston rods 24 acting on the brake plate 10 are visible in the drawing. In both the above described constructions the cylinder spaces 26 adjacent to the brake constituted by parts 4, 10, 11, 12, 13 are filled with pressure air only, whilst the cylinder spaces 27 adjacent to the clutch constituted by 6, 14, 16, 17 are filled with pressure air, but contain also pressure springs 28 which bear at one end against the corresponding cylinder cover and at the other end against the piston or pistons. The pressure air contained in the cylinder space or spaces 26 serves for engaging the clutch and for simultaneously disengaging the brake, whilst the pressure air contained in the cylinder space or spaces 27 has a smaller pressure and serves together with the pressure springs 28 for disengaging the clutch and engaging the brake. The admission of pressure air to the cylinder space or spaces 26 takes place through a conduit 29 provided if required with a pressure reducing device 30, an air vessel 31, a three-way valve 32, a central bore 33 of the shaft and radial bores 34 communicating with the central bore 33. The pressure air operating in the cylinder space or spaces 27 is taken from the air vessel 31, passes through a pressure reducing device 35, a pressure equalising vessel 36, a conduit 37 and through a central bore 38 of the shaft 3, from which radiate radial bores 39 leading to the cylinder space or spaces 27. The conduit 29 is connected with an air compressor or compressed air line. Owing to the provision of the pressure reducing device 35, the pressure in the cylinder space or spaces 27 is always smaller than, say one-third of, the pressure occurring in the cylinder space or spaces 26.

The arrangement shown in Figs. 1 and 2 operates in the following manner:

For engaging the clutch the three-way valve 32 is set to admit pressure air to the cylinder space 26 from the air vessel 31 via bores 33, 34. The pistons 20 then move under the action of the admitted pressure air to the right and move the clutch plates 14, 15 into contact whereby rotation of the driving member 16 is transmitted to the shaft 3. The air pressure in the cylinder space 26 is sufficiently high to overcome the counter pressure of the pressure springs 28 and the pressure in the cylinder space 27, which latter acts continuously. In order to disengage the clutch and simultaneously engage the brake, the three-way valve is so turned as to enable the pressure air contained in the cylinders 26 to escape into the atmosphere. The pressure air contained in the cylinders 27 and the springs 28 then move the pistons 20 or the piston 21 to the left in the sense of disengaging the clutch and engaging the brake.

The modified arrangement shown in Fig. 3 employing a single piston 21 in place of the pistons 20 functions in a similar manner and does not require further explanation.

It will be readily seen that the improved constructions have in the first instance the advantage that the springs 28 which have only the function of disengaging the clutch may be comparatively weak and can be readily placed within the available space. Moreover, adjusting such weak springs does not afford any difficulty. The springs 28 are, however, strong enough to disengage the clutch safely even should the pressure air admission fail, and move the pistons 20 or the piston 21 into the idle middle position shown in Fig. 1. The pressure air required for engaging the brake can be supplied without any difficulty as pressure air for engaging the clutch is already available. Therefore, the employment of this low-pressure pressure air does not substantially complicate the construction and it will be seen that with comparatively simple means very reliable operation of the clutch and brake can be attained.

The third construction shown in Fig. 4 differs from that shown in the previous figures, chiefly in that the compressed air cylinder 40 for operating the clutch and the brake is arranged outside the clutch and brake. This cylinder is stationary and coaxial with the shaft 3. The parts of this construction corresponding to parts of the construction shown in Figs. 1 and 2 are indicated by the same reference numerals. Thus 1 and 2 indicate in Fig. 4 bearings carrying the shaft 3. 4, 5 and 6 are the three sleeves of which the brake sleeve 4 is rigidly fixed to the shaft 3 by a feather key 7 and the clutch sleeve 6 by a feather 9. The sleeve 5 is likewise fixed to the shaft 3 by a feather or other means preventing rotation, but not shown in the drawings. 10, 11 indicate the two sets of brake plates, 12 indicates the stationary casing, 13 is a stop disc taking up the brake pressure, 14, 15 are the clutch plates, 16 is the driving member and 17 is a stop plate taking up the clutch pressure.

The admission of pressure air again takes place through a conduit 29, if required via pressure reducing device 30, via air vessel 31, and from the latter on the one hand via three-way valve 32 to the cylinder side 41, and on the other hand via conduit 37, pressure reducing means 35 and equalising vessel 36 to the other cylinder side 42, this latter cylinder side also containing pressure spring 43. The rod 44 of the piston 45 extends through a central bore 46 of the shaft 3 and carries at its free end two or more joints 47 to which are connected members 48 containing slideways. In these members are slidably mounted levers 49 pivoted at 50 in hubs or like suitable projections of the sleeve 5. Upon the levers 49 slide blocks 52 associated with rods 53, 53 which latter are connected to the outer brake plate 10 and the outer clutch plate 14 respectively.

The mode of operation of this third construction is substantially similar to that of the previously described constructions. By suitably setting the three-way valve 32, pressure air is admitted to the cylinder side 41 and the piston 45 is moved to the right, whereby, via members 48 and levers 49, the rods 53 are also moved to the right. This causes the clutch to be engaged and the brake to be disengaged simultaneously. On setting the three-way valve 32 in such a manner that the pressure air contained in the cylinder side 41 can escape into the open, the spring 43 and the low tension pressure air continuously contained in the cylinder 42 come into action and move the piston 45 to the left. The rods 53 are then also moved to the left so that the clutch is disengaged and the brake is engaged. This construction has substantially the same advantages as those mentioned in connection with the constructions of Figs. 1–3, but has also the additional advantage owing to the provision of the levers 48, 49, that the force required for obtaining the same clutch and brake actuating forces can be obtained by means of a smaller piston than in the first construction, or with the same size piston, but with a lower air pressure. In Fig. 4 piston 45, rod 44, guides 48, lever 49, rod 53 and the plates 10 and 4 are shown in the middle position in which the clutch is disengaged, and the brake is not yet engaged. This position is occupied by the various parts when the springs 43 alone are operative, there being no pressure on either side of the cylinder.

I claim:

1. In a combined friction clutch and brake the combination of: a casing; a driving member; a shaft mounted in said casing; a plate brake mounted on said shaft, said plate brake comprising movable brake plates mounted upon the shaft and brake plates mounted in the casing; a plate clutch mounted upon said shaft and comprising plates mounted upon said shaft and plates mounted upon said driving member; and means for simultaneously operating said plate brake and said plate clutch in opposite senses; fluid pressure means for actuating said brake and clutch operating means in a clutch engaging direction and combined spring and fluid pressure means for actuating said brake and clutch operating means in a clutch disengaging and brake engaging direction, said first mentioned fluid pressure means being at a higher pressure than the second mentioned fluid pressure means, and said spring means being just sufficiently strong to disengage the clutch, and said second mentioned fluid pressure means providing the additional force required for engaging the brake.

2. In a combined friction clutch and brake of the type wherein the clutch and the brake are simultaneously operated in opposite senses, the combination of: a casing; a shaft rotatably mounted in said casing; a driving member coaxial with said shaft; a plate clutch movably mounted on said shaft and having one set of plates slidable on and rotatable with said shaft and a second set of plates slidable in and rotatable with said driving member; a plate brake mounted on said shaft and having a set of plates slidable on and rotatable with said shaft and a second set of plates slidable in said casing; one clutch plate and one brake plate being rigidly connected together; and means for simultaneously moving said rigidly connected plates comprising a cylinder and a piston operatively associated with said plates, said piston being subjected on both sides to the action of pressure air and on one side only to the action of spring means, the pressure of the air acting on the same side as the spring being lower than the pressure of the air acting upon the other side of the piston, the higher air pressure serving to move the piston in opposition to the lower air pressure and the action of the spring in the sense of closing the clutch and releasing the brake, and the action of the lower air pressure and the springs serving upon removal of the high pressure to disengage the clutch and engage the brake, and the springs being so dimensioned as to be capable of holding the piston in a middle position in which both the brake and the clutch are released.

3. In a combined clutch and brake the combination of: a casing, a shaft rotatably mounted therein; a driving member coaxial with said shaft; a plate clutch mounted on said shaft and having a set of plates axially slidable on and rotatable with said shaft; and a second set of plates slidable in and rotatable with said driving member; a plate brake having a set of plates slidable on and rotatable with said shaft, and a second set of plates slidable in said casing; and means for simultaneously operating the clutch and the brake in opposite senses comprising a cylinder fixedly mounted upon said shaft between said clutch and said brake containing a piston having a piston rod rigidly connected to an adjacent clutch plate on the shaft and an adjacent brake plate on the shaft; spring means in said cylinder tending to move the piston towards the brake; first fluid pressure means acting upon the same side of the piston as the spring means; and second fluid pressure means acting upon the opposite side to move said piston to close said clutch in opposition to the action of the spring means and the first fluid pressure means, the pressure of said second fluid pressure means being higher than the pressure of said first fluid pressure means, the force exerted by said spring means alone being sufficient to move the piston into a neutral position in which both the clutch and the brake are disengaged.

4. In a combined clutch and brake the combination of: a casing; a shaft rotatably mounted therein; a driving member coaxial with said shaft; a plate clutch mounted on said shaft and having a set of plates axially slidable on and rotatable with said shaft; and a second set of plates slidable in and rotatable with said driving member; a plate brake having a set of plates slidable on and rotatable with said shaft, and a second set of plates slidable in said casing; means for rigidly connecting one brake plate upon the shaft with one clutch plate upon the shaft; and means for simultaneously operating the clutch and the brake in opposite senses by moving said connected plates comprising: a plurality of cylinders fixedly mounted upon said shaft between said brake and said clutch, each cylinder containing a piston operatively connected with said plates; spring means in each of said cylinders acting upon one side of the piston therein to move said piston in the sense of disengaging the clutch; first fluid pressure means acting upon the same side of the piston as the spring means; second fluid pressure means acting upon the opposite side of the piston and having a higher fluid pressure than the first fluid pressure means, said second fluid pressure means being sufficiently strong to move each piston against the action of the first fluid pressure means and the spring means to close the clutch and simultaneously disengage the brake, said spring means being alone of sufficient strength to move the piston into a neutral position in which both the brake and the clutch are disengaged.

5. In a combined clutch and brake the combination of: a casing; a shaft rotatably mounted therein; a driving member coaxial with said shaft; a plate clutch mounted on said shaft and having a set of plates axially slidable on and rotatable with said shaft; and a second set of plates slidable in and rotatable with said driving member; a plate brake having a set of plates slidable on and rotatable with said shaft, and a second set of plates slidable in said casing; means for rigidly connecting one brake plate on the shaft with one clutch plate on the shaft; and means for simultaneously operating the clutch and the brake in opposite senses by moving said connected plates comprising an annular cylinder fixedly mounted upon said shaft between said brake and said clutch; an annular piston in said cylinder having a plurality of piston rods acting upon said connected plates; a plurality of spring means in said cylinder acting upon one side of said annular piston to move same in the sense of disengaging the clutch; first low pressure fluid means acting upon the same side of the piston as the said spring means; second high pressure fluid pressure means acting upon the opposite side of said piston, said second fluid pressure means being sufficiently strong to move the piston in opposition to the action of the spring means and the low pressure fluid pressure means to close the clutch and simultaneously disengage the brake, said spring means being sufficiently strong to move by themselves the piston into a neutral position in which both the brake and the clutch are disengaged.

6. In a combined clutch and brake the combination of: a casing; a shaft rotatably mounted therein; a driving member coaxial with said shaft; a plate clutch mounted on said shaft and having a set of plates axially slidable on and rotatable with said shaft; and a second set of plates slidable in and rotatable with said driving member; a plate brake having a set of plates slidable on and rotatable with said shaft, and a second set of plates slidable in said casing; one brake plate upon the shaft and one clutch plate upon the shaft being rigidly connected, and means for simultaneously operating the clutch and the brake in opposite senses by moving said connected plates, comprising: a stationary cylinder coaxial with said shaft; a piston in said cylinder; means for transmitting movement from said piston to said connected plates, comprising a piston rod extending through an axial bore of the shaft and linkage connecting said piston with said rigidly connected plates; spring means in said cylinder acting upon one side of said piston to move said plates to release said clutch and hold said plates in a neutral position in which both the brake and the clutch are disengaged; first low pressure fluid means acting upon the same side of the piston as said spring means, and second high pressure fluid pressure means acting upon the opposite side of said piston to move said piston against the action of said spring means and said first fluid pressure means to close said clutch.

KARL KECK.